United States Patent [19]

Lohrentz et al.

[11] 4,429,517

[45] Feb. 7, 1984

[54] HARVESTING HEADER WITH ADJUSTABLE DRAPER FOR LEFT, RIGHT OR CENTER DELIVERY

[75] Inventors: Howard R. Lohrentz, Hesston; Cecil L. Case, Newton, both of Kans.

[73] Assignee: Hesston Corporation, Hesston, Kans.

[21] Appl. No.: 309,081

[22] Filed: Oct. 6, 1981

[51] Int. Cl.³ .................. A01D 35/14; A01D 57/20
[52] U.S. Cl. .................................. 56/181; 56/11.2; 56/14.5; 56/192; 198/314; 198/370
[58] Field of Search ............... 56/181, 192, 208, 11.2, 56/10.7, 14.5; 198/314, 370, 371, 631, 583, 584

[56] References Cited

U.S. PATENT DOCUMENTS

| | | | |
|---|---|---|---|
| 1,479,378 | 1/1924 | Davis | 198/583 |
| 1,792,691 | 2/1931 | Harris et al. | 56/181 |
| 3,214,002 | 10/1965 | Kirkpatrick et al. | 56/181 |
| 3,230,694 | 1/1966 | Fairbank et al. | 56/192 |
| 3,343,347 | 9/1967 | Burrough et al. | 56/181 |
| 3,497,051 | 2/1970 | Gugin | 56/181 |
| 3,695,015 | 10/1972 | Twidale et al. | 56/181 |
| 3,699,751 | 10/1972 | Ross et al. | 56/220 |

*Primary Examiner*—Gene Mancene
*Assistant Examiner*—David L. Tarnoff
*Attorney, Agent, or Firm*—Schmidt, Johnson, Hovey & Williams

[57] ABSTRACT

The header has generally transversely disposed, flat, apron-like conveyor mechanism for receiving the stalks of grain or other crop materials severed along the leading edge of the header and for gathering such materials so that they might be discharged in a continuous stream for producing a windrow. The conveyor mechanism comprises a pair of largely self-contained sections which may be latched together and shifted to one end of the header with their upper surfaces driven in a common leftward direction for left delivery and discharge, or shifted to the opposite end of the header and driven with their upper surfaces in a righthand direction for right end delivery of the materials, or they may be unlatched and separated while their upper surfaces are driven in opposite directions centrally toward one another for centered delivery of the materials. By virtue of a latch for releasably connecting the sections together and a cooperating, selectively operable latch releasing device, the necessary shifting adjustment of the sections between their various positions may be accomplished through the medium of only a single shifting assembly coupled with one of the sections. A special selectively engageable and disengageable drive line arrangement for the conveying surfaces of the conveyor sections includes components which are matingly engaged or disengaged and driven in one or the other of two opposite directions depending upon the shifted position of the sections by the shifter assembly.

9 Claims, 13 Drawing Figures

HARVESTING HEADER WITH ADJUSTABLE DRAPER FOR LEFT, RIGHT OR CENTER DELIVERY

TECHNICAL FIELD

This invention relates to the field of crop harvesting and, more particularly, to harvesting headers of the type which are operable to sever standing crops as the header is advanced through a field, to gather the crops thus severed along the leading edge of the header, and to subsequently discharge such gathered crops back onto the ground in a properly formed windrow.

BACKGROUND ART

Windrowing headers having the capability of selective positioning of their draper or conveyor sections for either left, right or center crop delivery and discharge are not per se new. However, the various means for effecting such shifting movement and for reversely or forwardly driving the sections when at their various right or left positions not heretofore been unduly costly, complex, and slow-operating.

SUMMARY OF THE PRESENT INVENTION

Accordingly, an important object of the present invention is to retain the three-way selective delivery feature of prior machines but to avoid in the present invention the complexities, costs and performance disadvantages inherent in prior arrangements for driving and adjustably shifting the conveyor sections of such headers. Pursuant to this objective, the present invention contemplates using a single hydraulic piston and cylinder assembly and related components as a shifter for one of the two conveyor sections of the header and then relying upon a selectively operable latching and unlatching arrangement for connecting the two sections together at those times when movement or shifting thereof to a different operational position is desired, at which time movement of the hydraulically shifted section is utilized to supply the movant force for the other section of the conveyor. By having the latching, unlatching and shifting functions controllable by the operator from a cab of the vehicle to which the header is attached, the adjustment procedure can be readily carried out on-the-go without requiring that the operator step down from the operator's position and assemble or disassemble and reorganize any components for adjustment purposes. Insofar as drive line aspects of the invention are concerned, an arrangement is provided whereby two oppositely rotating drive shafts are located generally in opposite end portions of the header for supplying driving power in their respective directions of drive to one or more of the conveyor sections depending upon the positions to which the sections have been placed by the shifting mechanism therefor. When the sections are shifted to the right end of the header in side-by-side relationship for lefthand delivery toward the opposite end of the header, the drive shaft at the right end if the header becomes matingly coupled with a driven shaft of the right conveyor section. The right conveyor section in turn has its driven shaft matingly coupled with the driven shaft of the left conveyor section. On the other hand, when the sections are located at the opposite left end of the header for crop delivery in a rightward direction, the drive shaft at the left end of the header matingly engages a driven shaft on the left conveyor section which in turn matingly engages a driven shaft of the right conveyor section such that all three of such shafts rotate in the same direction. In the third alternative, when the left and right sections are separated and disposed at opposite right and left ends of the header to present a central discharge opening therebetween, the left drive shaft mates with the driven shaft of the left section to drive the same rightwardly toward the center opening, while the right drive shaft mates with the driven shaft of the right conveyor section to drive the latter leftwardly toward the center opening. Mating engagement and disengagement of the various shafts of the drive line occur through the simple expedient of axial movement of the drive line components during shifting of the conveyor sections, totally without the need for manual intervention to insert or remove various connecting devices or pins and the like.

DETAILED DESCRIPTION

The harvester 10 as shown in FIGS. 1-4 includes as its most fundamental elements a propelling vehicle 12 and a header 14 attached to the front of the vehicle 12 for movement with the latter across and through a field. Lower links 16 (FIG. 4) and upper links 18 effect the attachment of header 14 to the vehicle 12 and may be raised and lowered so as to likewise raise and lower the header 14 by suitable hydraulic piston and cylinder means such as the unit 20 shown in FIG. 4. Suitable spring mechanism such as that illustrated by the spring 22 in FIG. 4 may be utilized to assist in proper flotation of the header 14. It is to be appreciated, of course, that although the present invention has been illustrated for use in connection with a self-propelled machine, such is by way of example only and is not intended to be in any way limiting to the scope of the present invention.

The header 14 includes a main frame broadly denoted by the numeral 24 which supports across the leading front edge thereof a reciprocatory sickle assembly 26 for severing crops from the ground as the harvester 12 is advanced. A reel 28 (FIG. 4) is also supported by the frame 24 and is located generally above and slightly forwardly of the sickle assembly 26 for the purpose of sweeping standing crops into the sickle assembly 26 and propelling the severed materials rearwardly into the header 14 as the harvesting operation progresses. A conveyor broadly denoted by the numeral 30 is situated within the confines of the frame 24 and is supported thereby in upwardly and rearwardly inclined disposition behind the reel 28 for receiving the materials as they are severed by the sickle assembly 26 and propelled rearwardly by reel 28. The conveyor 30 has a broad, flat upper surface and is commonly referred to as a "draper" by those skilled in this art.

Figure 4:
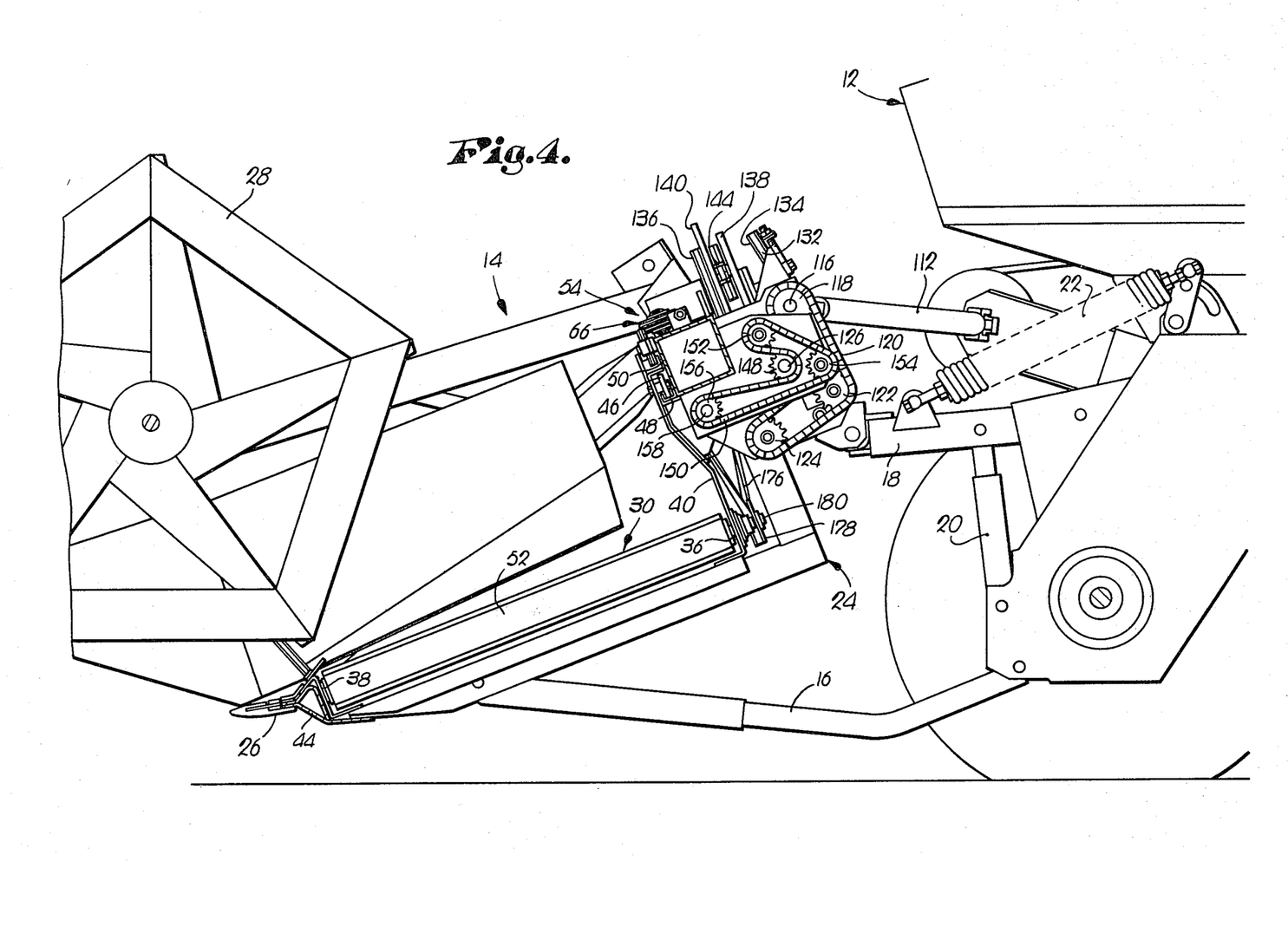
FIG. 4 is an enlarged, fragmentary, left elevational view of the header and propelling vehicle with the left end wall of the header removed to reveal details of construction.
Figure 7:
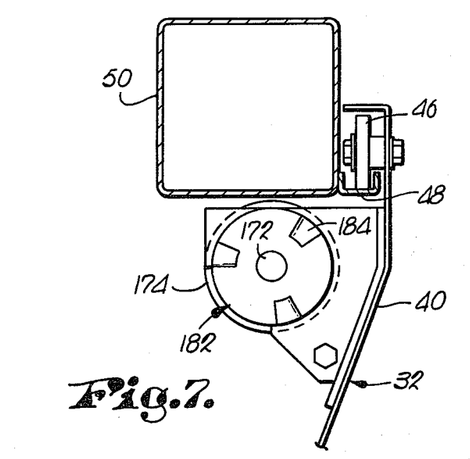
FIG. 7 is a fragmentary, transverse cross sectional view through the rear frame of the header.

The conveyor 30 includes two primary and somewhat independently operable conveyor sections 32 and 34 respectively. Each of the sections 32, 34 includes a pair of generally fore and aft extending rolls 36 (FIGS. 4, 10, and 11-13) at opposite ends of the sections 32 or 34 which are supported by elongated, front and rear, transversely extending support members 38 and 40 respectively. The front member 38 has a series of rollers 42 associated therewith which bear against the proximal face of a lower front beam 44 of the frame 24 so as to render the section 32 or 34 shiftable in a lateral sense relative to the frame 24. The upright, planar rear member 40 is likewise provided with supporting and guiding rollers 46 as shown in FIGS. 4 and 7 which ride within a track 48 secured to a transverse, upper rear beam 50 of the frame 24 along the length thereof. Each pair of rollers 36 is enveloped by an endless fabric or rubberized material 52 to be driven by the rollers 36 in order to present a moving, flat conveying surface for the crop materials.

Figure 11:
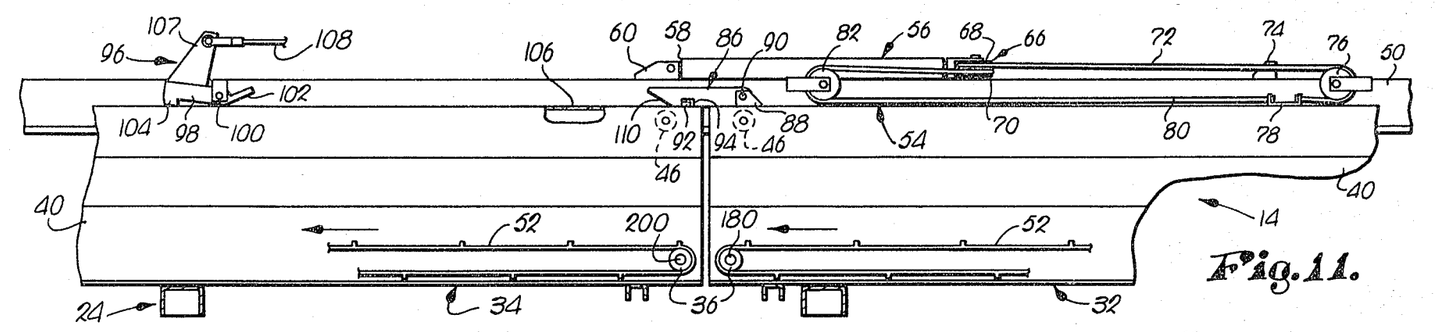
FIG. 11 is a fragmentary, schematic, front elevational view of the header with components removed for clarity and with the conveyor sections positioned and driven for rightward crop delivery and discharge.
Figure 12:
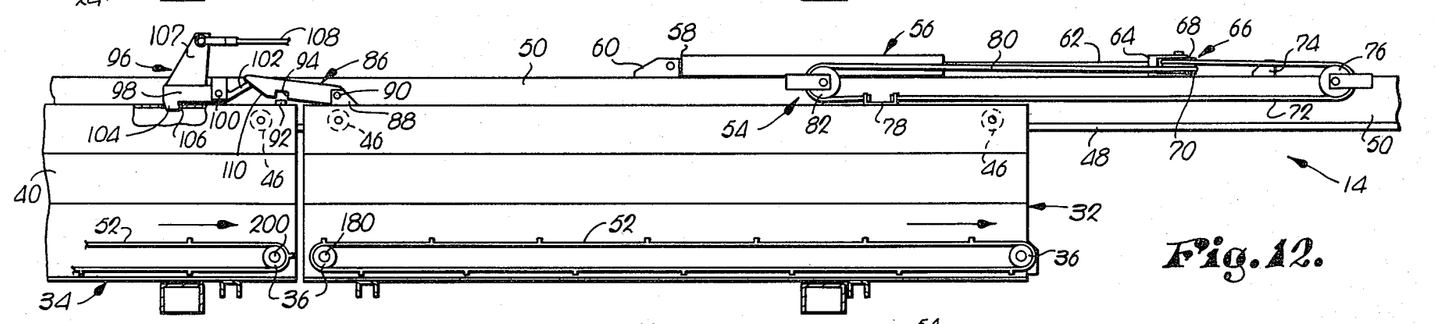
FIG. 12 is a similar fragmentary, schematic, front elevational view of the header but with the conveyor sections thereof situated and driven for leftward crop delivery and discharge.
Figure 13:
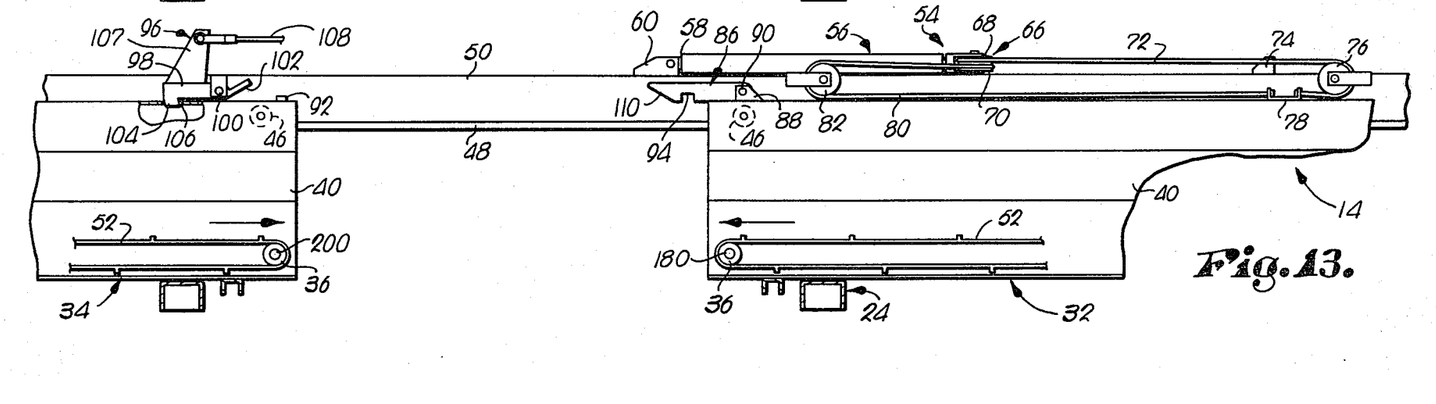
FIG. 13 is a fragmentary, schematic, front elevational view of the header similar to FIGS. 11 and 12 but with the conveyor sections positioned and driven for center crop delivery and discharge.

As shown in FIGS. 11, 12 and 13, the conveyor sections 32 and 34 are shiftable between a fully leftward position as shown in FIG. 11 (as viewed from the rear of the machine) for right end delivery of crop materials, a fully rightward position as shown in FIG. 12 and driven for lefthand delivery, and a separated position as shown in FIG. 13 and driven for center delivery. A shifter broadly denoted by the numeral 54 for effecting such positioning of the sections 32, 34 includes a single, fluid pressure, piston and cylinder assembly 56 having one end 58 thereof pivotally anchored to the upper rear beam 50 of the frame 24 by a pair of mounting lugs 60 situated substantially midlength of the beam 50. The rod 62 of assembly 56 has a clevis 64 at its outer end which carries a double sheave assembly 66 having an upper sheave 68 and a lower sheave 70 that are independently rotatable about a common substantially vertical axis. A first cable 72 has one end thereof securely fastened by an anchor 74 to the top surface of the beam 50 somewhat adjacent the left end thereof and is trained around the top sheave 68 and thence back to a vertically disposed sheave 76 rotatable about a horizontal axis and positioned on the front face of the beam 50 adjacent the left end thereof. From the sheave 76, the cable 72 returns rightwardly until reaching an anchor 78 secured to the upper portion of support member 40 of left conveyor section 32. A second cable 80 is secured at one end thereof to the anchor 78 on conveyor section 32 and extends along the front face of the beam 50 until looping around a sheave 82 rotatable about a substantially horizontal, fore and aft axis. From the sheave 82, the cable 80 returns to and is looped around the lower sheave 70 of double sheave assembly 54, and from sheave 70 the cable 80 extends to an anchor 84 on the top face of beam 50 at a location spaced rightwardly from the anchor 74 for the cable 72. In this manner, extension and retraction of the rod 62 of hydraulic cylinder assembly 56 transmits pulling power to the left conveyor section 32 via the cables 72 or 80 to effect shifting of the left section 32 in the desired direction along the trackway defined in the frame 24 by upper track 48 and the lower front beam 44.

As shown perhaps best in FIGS. 10-13, the left conveyor section 32 is provided with a latch 86 pivotally mounted on the support member 40 of conveyor section 32 by a mounting lug 88 that is located adjacent the right end of section 32. The latch 86 is free to swing by gravity about a pivot pin 90 associated with the mounting lug 88 in a generally vertical sense between latching positions as shown in FIGS. 11 and 13 and an unlatched position as shown in FIG. 12. An upstanding projection 92 on the left end of the support member 40 of conveyor section 34 is so disposed that it may be received within a downwardly opening notch 94 in the lower linear edge of the latch 86 when the latter is in its lowered position of FIGS. 11 and 13. Thus, the two sections 32 and 34 may be securely joined together by the latch 86 for shifting as a unit along the frame 24 under the action of the hydraulic cylinder assembly 56.

In order that the latch 86 may be remotely controlled such that the section 32 and 34 can be selectively interconnected or disconnected, a latch operating device 96 is provided on the frame beam 50 at a location substantially adjacent the right end of travel of the left section 32. The device 96 basically comprises a lever 98 that is vertically swingable about a horizontal pivot 100 that attaches the lever 98 to the front face of the beam 50. The left end of the lever 98 on one side of the pivot 100 is inclined generally upwardly and leftwardly to present a latch releasing component 102. On the other hand, on the opposite end of the lever 98 is disposed a downwardly projecting tang 104 which may be matingly received within an opening 106 in the top surface of the support member 40 of right section 34 when the latter is in its full rightward disposition of FIGS. 12 and 13. An upstanding crank 107 is secured to the lever 98 on the same side of pin 100 as the tang 104 and has its upper end coupled with an operating cable 108 which extends to the operator's station such as in the cab of the vehicle 12. The cable 108 is of the type which will exert a push-pull force depending upon the direction of actuation by the operator such that the device 96 may be operably rocked about the pivot 100 in either of its two opposite directions by the operator upon manipulation of the cable 108. As illustrated in FIG. 12, when the device 96 is pushed by the cable 108 to its counterclockwisemost position or is substantially adjacent such position as in FIG. 11, the component 102 is disposed within the path of travel of an inclined leading edge 110 of the latch 86 as it travels with the left section 32 along the frame 24, and the distance between the pivot 90 of the latch 86 and the pivot 100 of the device 96 is such that component 102 will engage the inclined surface 110 and lift the latch 86 until projection 92 has been cleared from the notch 94. On the other hand, if the device 96 is rocked clockwise from its positions of FIGS. 11, 12 and 13 so that the component 102 is substantially level rather than inclined, the component 102 will be out of the path of travel of the inclined edge or surface 100 so as to leave the latch 86 in its latching position to either remain engaged with the projection 92 or to become engaged therewith for purposes of retrieving the right section 34, depending upon the stage of operation of the conveyor section 32, 34.

Figure 5:
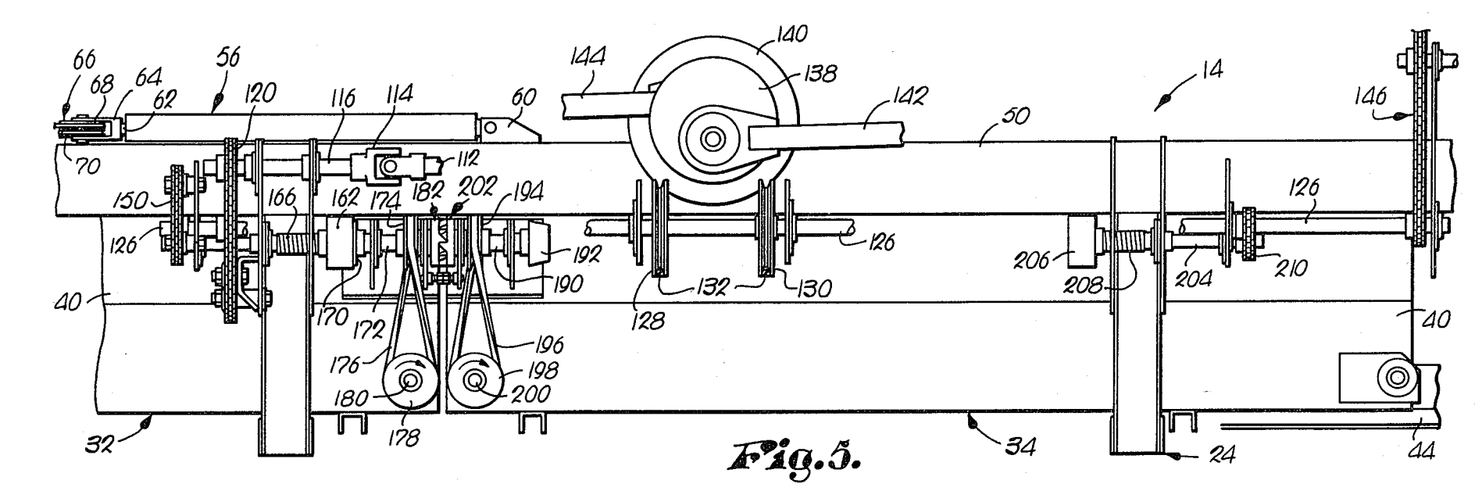
FIG. 5 is a fragmentary, rear elevational view of the header with certain parts broken away to reveal details of construction and with the conveyor section positioned for rightward delivery.

Driving power for the various components of the header 14 is supplied via a diagonally extending U-joint drive shaft 112 as shown in FIG. 4 which obtains driving power from mechanism within the vehicle 12. As shown in FIGS. 5, 6, 8, 9 and 10, the diagonal drive shaft 112 has a U-joint connection 114 with a relatively short jack shaft 116 journaled for rotation by suitable supporting structure along the back side of the header frame 24. The jack shaft 116 has a sprocket 118 at its left end (FIG. 4) about which its entrained a drive chain 120 that is also entrained about a pair of idler sprockets 122 and 124, as well as about a fourth sprocket (not shown) which is fixed to a long shaft 126 extending along the central portion of the rear beam 50. Adjacent the middle of the shaft 126, a pair of spaced apart sheaves 128 and 130 are located as shown for example in FIGS. 5, 8 and 9. The sheaves 128 and 130 receive opposite ends of an endless drive belt 132 which is also drivingly looped around a pair of double sheaves 134 and 136 shown only in FIG. 4, such sheaves 134 and 136 being generally rotatable about a fore and aft axis and respectively associated with a pair of circular, pitman mounting plates 138 and 140. The plate 138 is mechanically connected to the sheave 134 in order to be driven thereby, while the plate 140 is mechanically connected to the sheave 136 in order to be driven by that structure. A pitman 142 is eccentrically connected to the mounting plate 138 and extends toward the right end of the header 14 for ultimate driving connection with a sway bar (not shown) which in turn supplies driving power to one-half of the sickle assembly 26 which is split in a known manner and driven by two separate sources of drive at opposite ends thereof. Likewise, a second pitman 144 is eccentrically connected to the plate 140 and extends leftwardly therefrom to the left end of the header 14 for ultimate connection with a second sway bar (not shown) which in turn is utilized to drive the other half of the split sickle assembly 44 in the known manner. At the right end of the shaft 126 as shown in FIG. 5 is located a chain and sprocket assembly 146 which is ultimately connected with the reel 28 for rotating the latter in a counterclockwise direction viewing FIG. 4.

Figure 6:
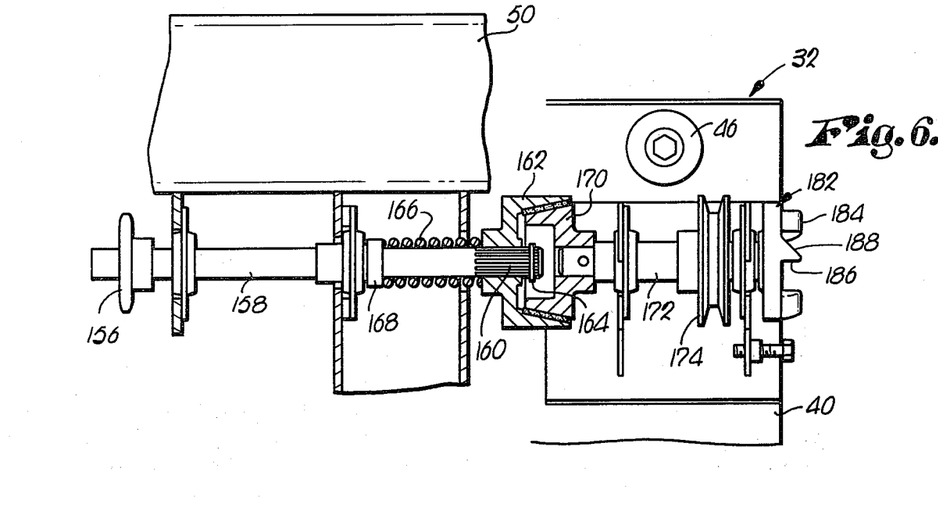
FIG. 6 is an enlarged, fragmentary view of a portion of the drive line for the conveyor sections with parts being shown in cross section and elevation for clarity.

The left end of the shaft 126 projects outwardly beyond the drive chain 120 and carries a sprocket 148 (FIG. 4) that is backwrapped by a drive chain 150 which in turn is entrained around a pair of idler sprockets 152 and 154. The drive chain 150 is also entrained around a fourth sprocket 156 fixed to a drive shaft 158, details of which are shown in FIG. 6 and on a reduced scale in FIGS. 4, 5, 8 and 9. The drive shaft 158 extends rightwardly from the sprocket 156 for a relatively short distance along the back of the header frame 24 and terminates in a splined end 160 having a cup-shaped, frictional coupler component 162 retained thereon for rotation therewith. The coupler component 162 is reciprocable axially of the shaft 158 on a limited basis as defined by a lock ring 164 on the one hand and a compression spring 166 on the other hand that is trapped between and engages the back side of the cuplike component 162 and a spaced collar 168 on the shaft 158.

The coupler component 162 is selectively engageable and disengageable with a truncated, conelike coupler component 170 fixedly secured to one end of a driven shaft 172 that is attached to the back side of the left conveyor section 32 for shifting movement with the latter. The shaft 172 is in axial alignment with the shaft 158 and the coupler components 162 and 170 are so sized that the component 170 is matingly received within the component 162 in frictional, drive transmitting engagement therewith when the left conveyor section 32 is in its leftwardmost position. The driven shaft 172 is bearing mounted in a suitable manner and has a sheave 174 fixed thereto between its opposite ends for rotation with the shaft 72. Sheave 174 is entrained by an endless belt 176 that is twisted 90° and looped at its lower end about a sheave 178 (FIGS. 4, 5, 8 and 9) rotatable about a generally fore and aft axis and fixed to a shaft 180 that supplies driving power to the proximal conveyor roll 36 of the left conveyor section 32. At its opposite, inner end the driven shaft 172 is provided with a coupler plate 182 having a series of circumferentially spaced projections 184 on the inboard face thereof, such projections 184 having rotatably oppositely facing surfaces 186 and 188 which are normal to the proximal plane or face of the plate 182 and inclined in the direction of rotation with respect to the plane of the plate 182 respectively.

The right conveyor section 34 has structure corresponding to the components 170–188 of the left section 32 but disposed in the opposite orientation. In this regard, at the left end of the right section 34 is located a second driven shaft 190 (FIGS. 5, 8 and 9) that is mounted for rotation in axial alignment with the driven shaft 172 of left conveyor section 32. The driven shaft 190 has a truncated conelike coupler component 192 at its outboard end, a sheave 194 intermediate its opposite ends and entrained by a twisted, endless belt 196 that is also looped around a lower sheave 198 which supplies driving power to a fore and aft shaft 200 coupled with the roll 36 of the right conveyor section 34, and an inboard located coupler plate 202 having projections 204 oriented to matingly engage the corresponding projections 184 of coupler plate 182 when the plates 202 and 182 are in face-to-face engagement as shown in FIGS. 5 and 9.

Fixed to the header frame 24 rightwardly of the central portion thereof and along the back of the header 14 is a second drive shaft arrangement corresponding to the components 158 through 168 previously described but oriented in the opposite direction. In this regard, a drive shaft 204 is suitably bearing supported for rotation in axial alignment with the shafts 190, 172 and 158 and has a cuplike friction coupler 206 spline-mounted on the inboard end thereof in the same manner that the component 162 is mounted on the shaft 158. Spring 208 cushions limited axial displacement of the coupler component 206 in the same manner that the spring 166 cushions the limited axial shifting of the coupler component 162. At the opposite, outboard end of the shaft 204, a chain and sprocket assembly 210 couples the shaft 204 with the long shaft 126 so as to receive driving power therefrom. It is important to note that because of the way in which the chain 150 at the left end of the shaft 126 is backwrapped around the sprocket 148 relative to the way in which it is wrapped around the sprocket 156 associated with shaft 158, the shafts 126 and 158 rotate in opposite directions. As a result of the chain and sprocket assembly 210, the drive shaft 204 is caused to rotate in the same direction as the long shaft 126, and thus the two drive shafts 158 and 204 are caused to rotate in relatively opposite directions at all times that the main U-joint drive line 112 from the vehicle 12 is in operation.

OPERATION

Figure 1:
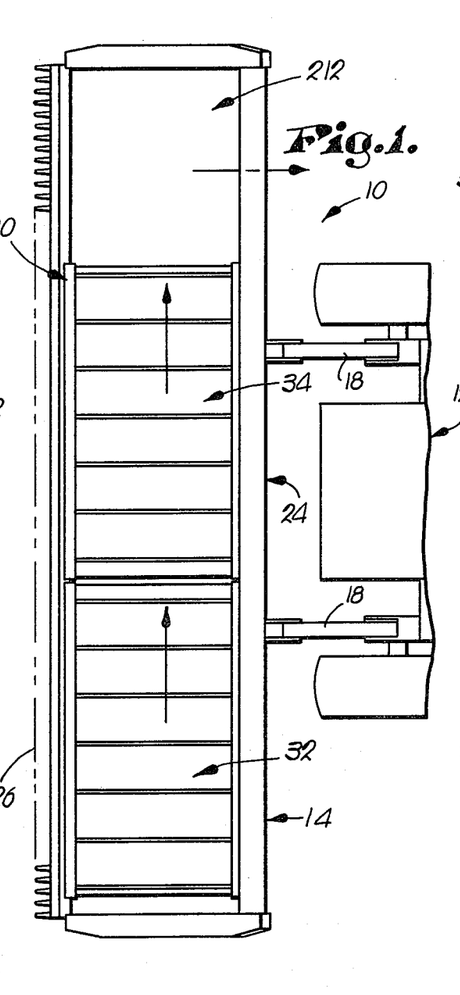
FIG. 1 is a schematic top plan view of a harvesting header according to the principles of the present invention connected to the front of a self-propelled vehicle with the conveyor sections of the header situated for rightward crop delivery and discharge as viewed from the rear of the machine.
Figure 2:
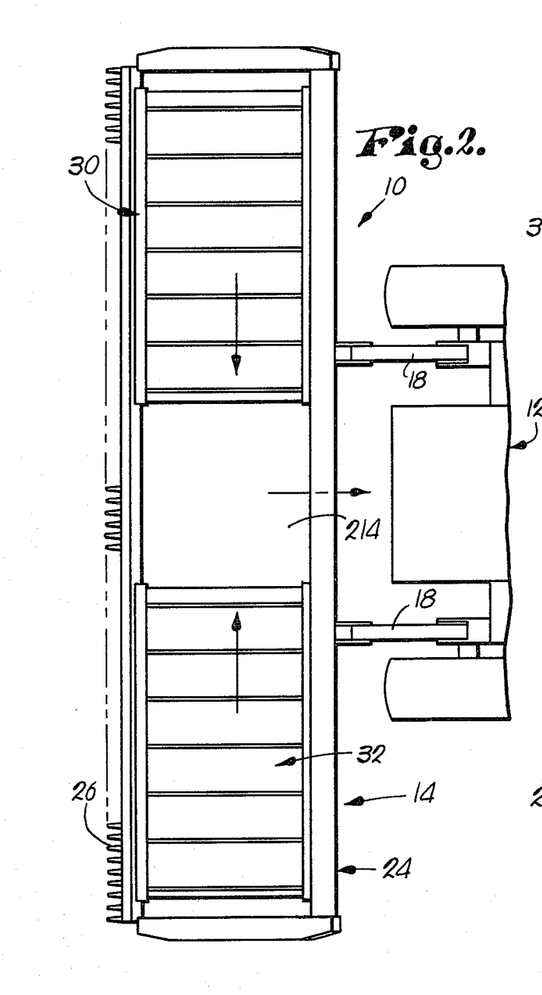
FIG. 2 is a schematic view of the header and vehicle of FIG. 1 but with the conveyor sections shifted to opposite ends of the header and driven in directions for center delivery and discharge of the crop material.
Figure 3:
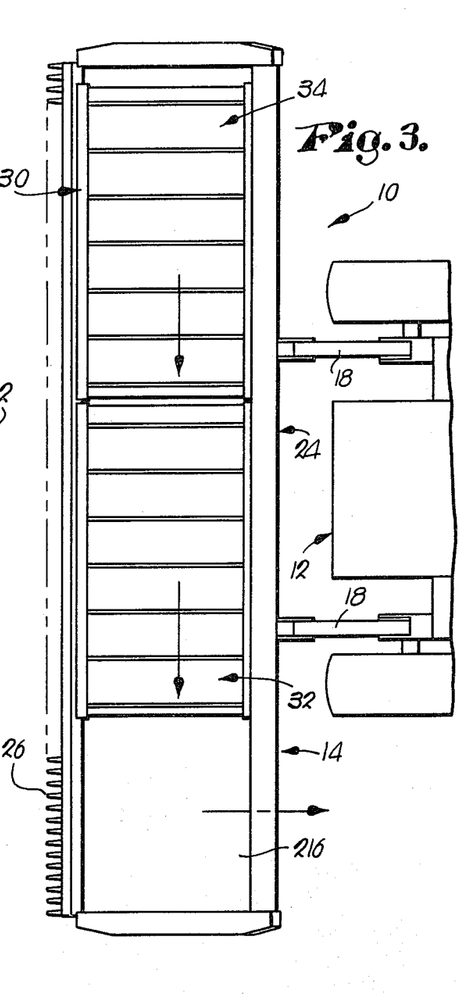
FIG. 3 is a schematic view similar to FIGS. 1 and 2 but with the conveyor sections shifted toward the right end of the header and driven in a direction for leftward delivery and discharge of the crop materials.
Figure 8:
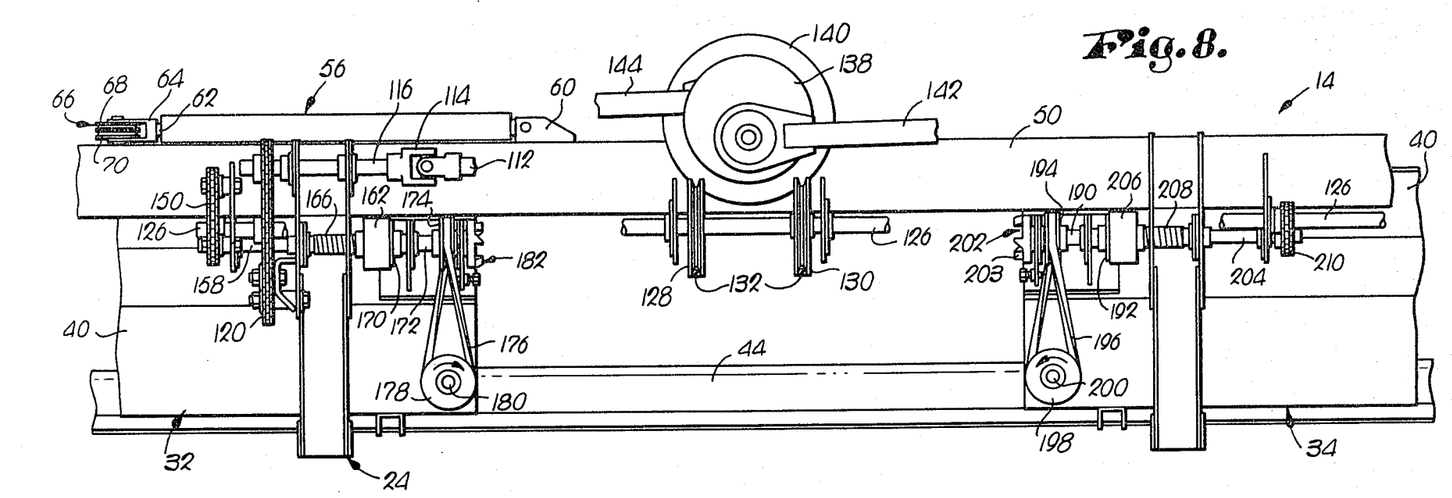
FIG. 8 is a fragmentary, rear elevational view of the header similar to FIG. 5 but with the conveyor sections separated and driven for center delivery and discharge of crop materials.
Figure 9:
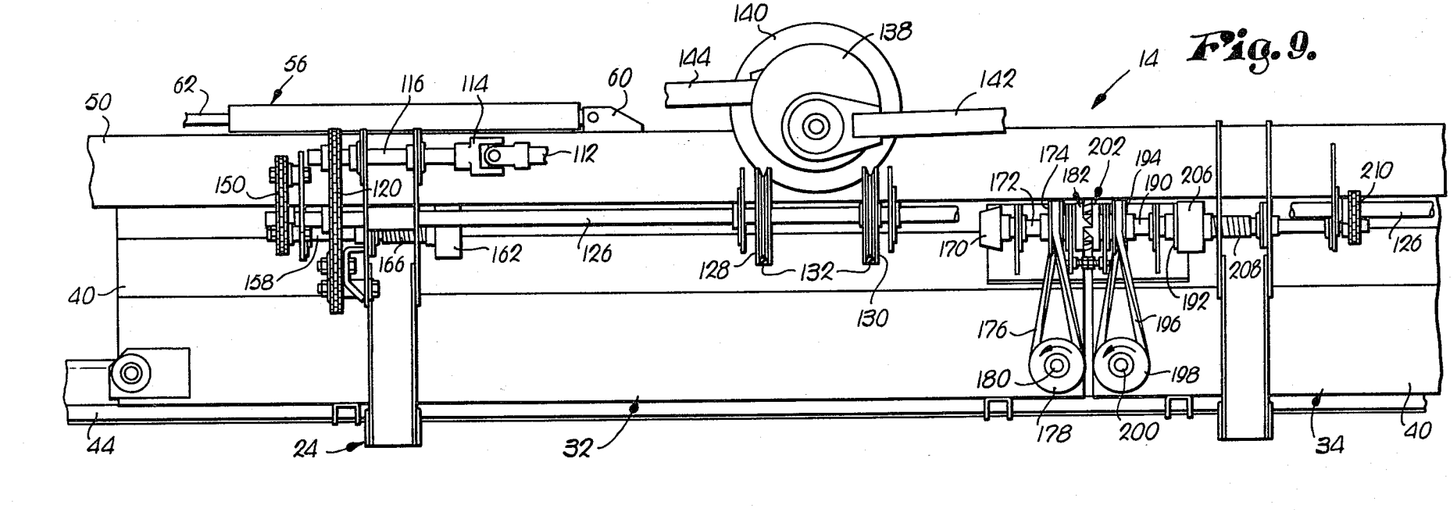
FIG. 9 is a fragmentary, rear elevational view of the header as in FIGS. 5 and 8, but with the conveyor sections situated at the right end of the header for left crop delivery and discharge.
Figure 10:
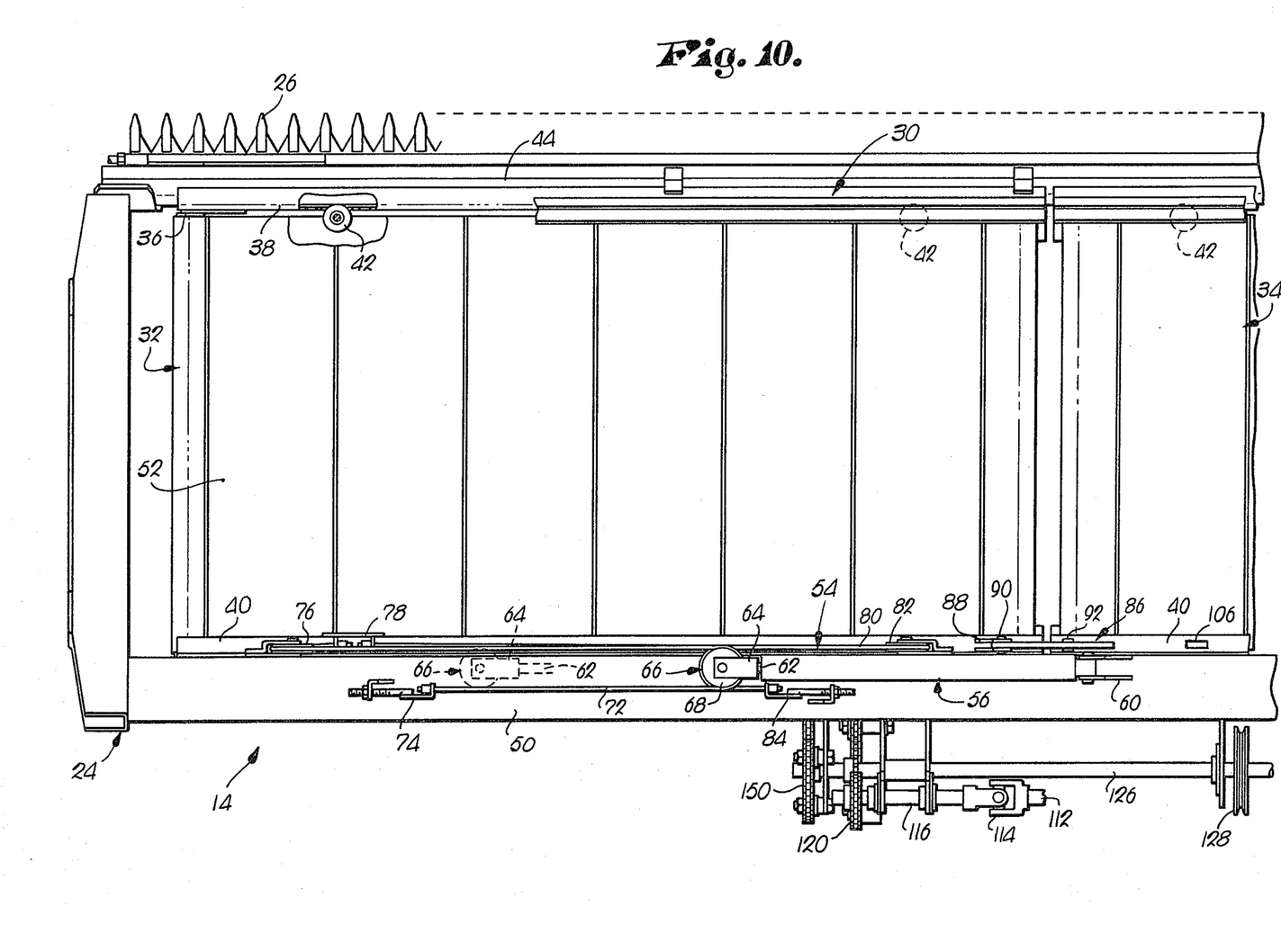
FIG. 10 is a fragmentary, top plan view of the left end of the header when the conveyor sections are positioned and driven for rightward crop delivery and discharge.

The header 14 is adjusted for righthand delivery as shown in FIGS. 1, 5 and 11, for center delivery as shown in FIGS. 2, 8 and 13, and for lefthand delivery as shown in FIGS. 3, 9 and 12. The combined length of the conveyor sections 32 and 34 is less than the length of the header 14 so that a discharge opening for crop material moved by the section 32, 34 is always presented regardless of the particular positions thereof. For example, when the sections 32, 34 are disposed for righthand delivery and are shifted to their leftwardmost positions, the discharge opening 212 is defined at the right end of the header 14 in the bottom of the latter. When the conveyor sections 32 and 34 are disposed for center delivery and are thus located at opposite ends of their path of travel, a discharge opening 214 is disposed centrally of the header 14 in the bottom thereof. And, when the conveyor sections 32, 34 are disposed for lefthand delivery and are located at the rightwardmost end of their path of travel, a discharge opening 216 is presented at the left end of the header 14 in the bottom thereof. Such positioning of the discharge point for crop materials with respect to the header 14 can be especially beneficial with respect to the practice of forming double windrows, for example, in which the discharging material is laid down in a windrow beside one previously formed in order that the harvesting machine subsequently processing the crop materials will have a larger volume of material to pickup along each pass across the field.

Assuming that the header 14 is initially disposed for righthand delivery as shown in FIG. 1, the conveyor sections 32, 34 are maintained in a latched together condition by the latch 86 as shown in FIG. 11, and the piston and cylinder assembly 56 remains fully retracted so that the cables 72 and 80 associated therewith maintain the left conveyor section 32 in its full leftward condition to keep the conical friction coupler 170 of shaft 172 matingly received within the cuplike coupler 162 of drive shaft 158. Inasmuch as the drive shaft 158 is constantly rotating in a clockwise direction viewing FIG. 4, clockwise rotation is likewise transmitted to the sheave 174 by the driven shaft 172 to in turn drive the lower sheave 178 in a clockwise direction as shown in FIG. 5. This, therefore, has the result of driving the left conveyor section 32 in a rightward direction. In view of the fact that the latch 86 holds the sections 32 and 34 in side-by-side relationship at this time, the coupler plates 182 and 202 of sections 32 and 34 respectively are held in face-to-face engagement with one another so as to drivingly interengage their respective projections 184 and 204 whereby driven shaft 190 of right conveyor section 34 is also driven in a clockwise direction viewing FIG. 4 to in turn drive the lower sheave 198 in a clockwise direction as shown in FIG. 5 such that conveyor section 34 is also rightwardly driven.

If it is then desired to adapt the header 14 for lefthand delivery as shown in FIG. 3, the hydraulic cylinder assembly 56 is then actuated to extend the rod 62 thereof such that the cable 80 pulls the left section 32, and hence also the right section 34, rightwardly as the cable 72 pays out from double sheave assembly 66. As the conveyor sections 32, 34 move toward the right end of their path of travel, the tang 104 of latch operating device 96 bears against the under moving support member 40 of right conveyor section 34 until such time as opening 106 comes into alignment with the tang 104, whereupon, if the device 96 is springloaded as it preferably is, the tang 104 will be pushed down into the receiving opening 106 so as to releasably lock the right conveyor section 34 in its full rightward position. The left conveyor section 32 is held in side-by-side relationship to the right section 34 by the extended hydraulic cylinder assembly 56 and the tension in cable 80.

During the time that the sections 32 and 34 are shifting as a unit to their rightward positions, the conical coupler 170 of driven shaft 172 is withdrawn from the receiving coupler component 162 of shaft 158 such that driving power to the driven shaft 172 and 190 is temporarily halted, even though the shafts 172 and 190 remain operably interengaged via the coupler plates 182 and 202. As the conveyor sections 32, 34 then reach their rightward positions, the conical coupler 192 of driven shaft 190 enters into the rotating cuplike coupler 206 of drive shaft 204 which, it will be recalled, is rotating in a counterclockwise direction viewing FIG. 4. Thus, as the couplers 192 and 206 come into frictional interengagement, the driven shafts 190 and 172 commence rotating in a counterclockwise direction viewing FIG. 4 to in turn rotate the sheaves 198 and 178 in a counterclockwise direction as shown in FIG. 9. This causes the rolls 36 of the conveyor sections 32 and 34 to likewise be driven in a counterclockwise direction viewing FIG. 9, whereby the upper surfaces of the sections 32, 34 are driven leftwardly toward the discharge opening 216.

Adapting the header 14 for center delivery simply requires that the left section 32 be separated from the right section 34 and returned to its full leftward position. This is accomplished by merely actuating the hydraulic cylinder assembly 56 in such a way that the rod 62 thereof is retracted so that the cable 72 pulls on the left section 32 as the cable 80 pays out of the sheave assembly 66. It is to be noted that with the actuator device 96 disposed in a position to maintain the tang 104 thereof inserted into the opening 106, the latch releasing component 102 is in such a position as to engage the inclined surface 110 of latch 86 and hold the latter up out of latching engagement with the projection 92 whenever the left conveyor section 32 is in or adjacent to its rightmost position. Thus, as left section 34 is shifted leftwardly by the hydraulic shifter assembly 56, the latch 86 remains unlatched from the projection 92 until leaving engagement with the component 102 as a result of departing movement of the conveyor section 32, whereupon the latch 86 simply falls by gravity to its lowered position as illustrated in FIG. 13. Left conveyor section 32, therefore, leaves the right conveyor section 34 behind as section 32 moves leftwardly toward its FIG. 13 position.

As conveyor section 32 departs leftwardly from conveyor section 34, the coupler plates 182 and 202 become disengaged such that driving power to the driven shaft 172 of conveyor section 32 is temporarily halted. Driven shaft 190 of right conveyor section 34 continues to rotate in a counterclockwise direction viewing FIG. 4, however, such that the top surface of conveyor section 34 continues to move leftwardly.

As the left conveyor section 32 arrives at its leftward position as in FIGS. 2, 8 and 13, the cone coupler 170 of driven shaft 172 becomes received within the rotating cuplike coupler 162 of drive shaft 158. Consequently, clockwise rotation of the driven shaft 172 (as viewed in FIG. 4) is once again established so that the upper surface of the left section 32 moves rightwardly toward the central discharge opening 214. Thus, both upper surfaces of the conveyor sections 32, 34 are driven toward the central opening 214 for centrally disposed crop discharge therethrough.

With the two sections 32 and 34 separated as shown in FIG. 2, it is a simple matter to retrieve the section 34 if desired in order to reestablish rightward crop delivery. This is accomplished by shifting the left section 32 over into side-by-side relationship with the right section 34 and then locking the two sections together through the latch 86 before returning the two sections 32, 34 to the left end of their path of travel as a unit. It is to be noted that as the left section 32 approaches the right section 34, the inclined surface 110 of the lowered latch 86 makes engagement with the projection 94 on top of the right section 34. As rightward shifting of the left section 34 continues, such interengagement has the effect of camming the latch 86 slightly upwardly so that the latter rides up and over the projection 92 against the force of gravity until such time as the notch 94 comes into alignment with the projection 92, whereupon the latch 86 drops back down and the projection 92 becomes received within the notch 94. In order to effect such engagement of the latch 86 with the projection 92, it is necessary that the operator pull on the cable 108 so as to rock the device 96 sufficiently clockwise viewing FIGS. 11, 12 or 13 that the component 102 will be rocked below the path of travel of the inclined surface 110 of latch 86 to avoid raising the same to its unlatched position as shown in FIG. 12. Thus, with the latch 86 relatched and the device 96 appropriately rocked to maintain the component 102 lowered and the tang 104 lifted out of the opening 106, the hydraulic shifter assembly 56 may then be retracted so as to cause the conveyor sections 32, 34 to shift leftwardly as a unit.

We claim:

1. In a harvesting header having a pair of transverse crop conveyor sections shiftable laterally in opposite directions relative to a frame of the header between cooperating positions for alternative left, right and center delivery of crops severed by the header during advancement thereof, the improvement comprising:
   a shifter operably coupled with one of said sections for effecting said lateral shifting thereof;
   a releasable latch connecting the other of said sections with said one section for causing conjoint lateral shifting of both sections as a unit when said one section is operated by the shifter; and
   means for selectively releasing said latch to permit individual shifting of the one section by said shifter as said other section remains stationary,
   said other section having no means for shifting the same in either lateral direction except when coupled with said one section by said latch.

2. In a harvesting header as claimed in claim 1, wherein said releasing means includes a device mounted on said frame for selective movement into and out of the path of travel of said latch, said device being operable when disposed within said path of travel and engaged by said latch to effect said release thereof.

3. In a harvesting header as claimed in claim 2, wherein said device is provided with structure disposed for engaging and holding said other section against shifting when the device is located in the latch releasing position thereof.

4. In a harvesting header as claimed in claim 3, wherein said device is rockably mounted on said frame, said structure being disposed on one side of the axis of rocking movement thereof, said device including a latch engaging and releasing component on the opposite side of said axis, 5. In a harvesting header as claimed in claim 1, wherein said shifter comprises a fluid-pressure operated assembly coupled between said frame and said one section.

6. In a harvesting header having a pair of transverse crop conveyor sections shiftable laterally relative to a frame of the header between cooperating positions for alternative left, right and center delivery of crops severed by the header during advancement thereof, said sections being side-by-side at one end of their path of shifting travel and driven leftwardly for left delivery of crops, being side-by-side at the end of their path of shifting travel opposite to said one end and driven rightwardly for right delivery of crops, and being centrally spaced apart at opposite ends of their path of shifting travel and driven toward one another for center delivery of crops, the improvement comprising:
   a pair of oppositely driven drive shafts;
   means for operably coupling both of said sections with one of said drive shafts when the sections are at said one end of their path of travel for left delivery of crops by both sections;
   means for operably coupling both of said sections with the other of said drive shafts when the sections are at said opposite end of their path of travel for right delivery of crops by both sections; and
   means for operably coupling only one of said sections with said one drive shaft and only the other of said sections with said other drive shaft when the sections are spaced apart at opposite ends of their path of travel for center delivery of crops by the sections.

7. In a harvesting header as claimed in claim 6, wherein each of said drive shafts is provided with a coupler thereon and each of said sections is provided with a driven shaft having couplers at opposite ends thereof, one coupler of each driven shaft being adapted for selective mating engagement or disengagement with the coupler of a corresponding drive shaft and the other coupler of each driven shaft being adapted for selective mating engagement or disengagement with the corresponding other coupler of the other driven shaft, depending upon the positions of said sections along their path of travel.

8. In a harvesting header as claimed in claim 7, wherein said drive and said driven shafts are disposed in axial alignment with one another and with said couplers.

9. In a harvesting header as claimed in claim 6, wherein one of said sections is provided with a shifter operably coupled between the frame and said one section for effecting said shifting thereof and with a releasable latch for connecting the sections together for shifting thereof as a unit by said shifter, there being means on said frame selectively positionable within the path of travel of said latch as it is carried by said one section for releasing the latch.

* * * * *